(12) United States Patent
Wichern (10) Patent No.: US 8,127,810 B2
(45) Date of Patent: *Mar. 6, 2012

(54) INTERNAL WHEEL SUSPENSION AND SHOCK ABSORBING SYSTEM

(76) Inventor: David L. Wichern, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/924,958

(22) Filed: Oct. 8, 2010

(65) Prior Publication Data

US 2011/0030861 A1 Feb. 10, 2011

Related U.S. Application Data

(60) Division of application No. 12/378,112, filed on Feb. 12, 2009, now Pat. No. 7,810,533, which is a continuation of application No. 11/366,937, filed on Mar. 2, 2006, now abandoned.

(60) Provisional application No. 60/658,619, filed on Mar. 4, 2005.

(51) Int. Cl.
*B60B 9/08* (2006.01)
(52) U.S. Cl. ............................................. 152/93; 152/87
(58) Field of Classification Search .......... 152/1, 17–18, 152/87–88, 91, 93, 97, 103
See application file for complete search history.

(56) References Cited

U.S. PATENT DOCUMENTS

| | | | |
|---|---|---|---|
| 969,024 A | 8/1910 | Baker |
| 985,039 A | 2/1911 | Kimball |
| 1,086,162 A | 2/1914 | Gray |
| 1,144,879 A | 6/1915 | Ubezzi |
| 1,155,246 A | 9/1915 | Jutila |
| 1,306,951 A | 6/1919 | Cruthers |
| 1,465,747 A | 11/1919 | Vobach |
| 1,343,986 A | 6/1920 | Shafer |
| 1,420,839 A | 6/1922 | Henrie |
| 1,436,840 A | 11/1922 | Weirich |
| 1,459,565 A | 6/1923 | Yankauer |
| 1,584,679 A | 5/1926 | Stoltz |
| 1,979,935 A | 4/1934 | Henap |
| 3,896,868 A | 7/1975 | Molitor |
| 6,698,480 B1 | 3/2004 | Cornellier |
| 7,810,533 B2 | 10/2010 | Wichern |
| 2006/0197305 A1 | 9/2006 | Wichern |

*Primary Examiner* — Jason Bellinger
(74) *Attorney, Agent, or Firm* — Paul M. Denk (57) ABSTRACT

An internal wheel suspension and shock absorbing system, including a hub with radially extending rods or blades, cooperating with sector braces, fixedly mounted by hubs to the interior of the rim for a wheel. The rods and blades secure onto a hub, that mounts onto the vehicle axle, for rotation. When a force is encountered, the forces are absorbed by the blades that extend either through or cooperate with the braces and biasing springs, which are adjustable, that bias against the outer radial edges of the blades or telescoping rods, and absorb the vector forces generated from any impact.

5 Claims, 5 Drawing Sheets

INTERNAL WHEEL SUSPENSION AND SHOCK ABSORBING SYSTEM

CROSS REFERENCE TO RELATED APPLICATION

This divisional patent application claims priority to the continuation patent application having Ser. No. 12/378,112, filed Feb. 12, 2009 now U.S. Pat. No. 7,810,533, which claims priority to the non provisional patent application having Ser. No. 11/366,937, filed Mar. 2, 2006 now abandoned, which claims priority to the provisional patent application having Ser. No. 60/658,619, having filing date Mar. 4, 2005.

BACKGROUND OF THE INVENTION

This invention relates generally to a shock absorbing and suspension system for a wheel, and more specifically pertains to an internal wheel suspension and shock absorbing means.

There have been numerous suspension systems that have been employed for enhancing shock absorption during application of the wheel upon cycles, bicycles, automobiles, and other vehicles. Usually these types of suspension systems relate to the use of some form of springs, coil springs, leaf springs, and normally provide the absorption of shock in the vertical direction. But, where a vehicle is utilized, in particular off-road, the type of terrain encountered may present forces that are generated in other than the vertical direction, and could be even horizontally exerted, or angularly exerted, in addition to impact and shock that is encountered along the vertical dimension. These types of suspension systems, for cushioning the ride of any vehicle, in the application of their components, are well documented.

The current invention is designed to provide for a suspension system that can absorb shock, more efficiently, that is exerted from the vertical and from other and related angular directions.

Initially, as early as 1951, a spiral type of suspension spring was utilized upon at least the rear wheel of a motorcycle, in order to provide better absorption of the forces of impact, particularly when the cycle is used in off road racing and competition.

Related types of suspensions, that have been patented, can be seen in the early U.S. Pat. No. 985,039 to Kimball. This particular device shows a spring wheel. This particular spring wheel shows a variety of semi-radially disposed spokes, each of which has a spring bias rod and tube combination, and which surrounds the hub, for suspending the rim and its tire in place.

The U.S. Pat. No. 1,086,162 to Gray, shows another spring wheel. In this instance, the spokes essentially include spring mounted rod and tube combinations, in order to further buffer and provide shock absorbing for the supported wheel.

The U.S. Pat. No. 1,144,879 to Ubezzi, shows another vehicle wheel. This one is similar to the previously described Gray patented device, wherein the spokes essentially have spring mounts within them, to enhance shock absorbing.

The U.S. Pat. No. 1,155,246 to Jutila, shows another resilient wheel. This device does incorporate tangential springs, inner poles between spokes and the rim, apparently for providing cushioning with respect to the rim. The steel wires of the wheel are fixed, in the manner of spokes, between the rim brackets and the inner rim ring.

The U.S. Pat. No. 1,306,951 to Cruthers, shows a yieldable bearing and support therefor. This is more of a bearing but does incorporate an inner hub, with the outer rim, and does include lateral cushioning springs within its structure. These are biased against the rocker arms. Thus, lateral support is provided through this type of structure, for a wheel like structure, although, it is not of the type as shown for the current invention.

The U.S. Pat. No. 1,343,986 to Shafer, shows another resilient wheel. This one includes spokes, identified as helical springs upon the elements as shown, but these connect directly between the hub, and the outer rim.

The U.S. Pat. No. 1,436,840 to Weirich, is upon another vehicle wheel. This device apparently pivotally connects its arms to the outer rim or tread member of the wheel, and does include a series of shock absorbing devices therebetween. It appears that there may be a direct connection between the hub and the rim, through some type of linkage on the shown arms.

The U.S. Pat. No. 1,456,565 to Yankauer, shows another resilient wheel. This patent shows a structured hub that incorporates a series of members, having varying members extending therefrom, with tangential springs provided for mounting of the hub relative to its rim. This differs from the structure of the current invention.

The U.S. Pat. No. 1,465,747 to Vobach, shows another spring wheel. This is just another way of mounting through the use of a spring by a spoke between the hub and the rim of the tire.

The U.S. Pat. No. 1,584,679 to Stoltz, shows another resilient wheel that uses spokes arranged at right angles, and which are spring biased, to add to the support for the wheel, and to add to the absorption of shock.

The U.S. Pat. No. 1,979,935 to Henap, shows a hydraulic spoke wheel. This device includes a variety of hydraulic cylinders arranged as spokes at various angles in order to enhance the resiliency of mounting of the wheel upon its hub.

The U.S. Pat. No. 3,896,868 to Molitor, shows a resiliently mounted auxiliary wheel for a tractor. This device includes a variety of spring biased telescoping rods and tubes, as shock absorbers, functioning as spokes within the rim, for supporting the wheel or tire.

Finally, the U.S. Pat. No. 6,698,480 to Cornellier, shows a non-pneumatic tire and wheel system. This device simply utilizes compound shocks, in lieu of spokes, within the solid tire. This is not the structure of the current invention.

SUMMARY OF THE INVENTION

Essentially, this invention relates to an internal wheel suspension and shock absorbing system. The device includes the suspension and shock absorbing means that are arranged internally of the wheel structure, and can absorb much greater shock, even that which is angularly generated, particularly for an off-road vehicle such as a bicycle, motorcycle, motor vehicle, ATV, SUV, and the like.

The wheel structure, at a hub at a central axis, in the preferred embodiment, has rigidly mounted thereto a plurality, such as three, radially disposed bladed devices. These bladed devices are fixed to the hub, and which is pivotally mounted onto the axle, and rotates therewith. The blades extend radially outwardly within the tire. The tire has a triangulated, or polygonal form of braces, designed to accommodate each of the blades, therebeing a brace for each of the flanges or blades, for the suspension. The braces are parallel to a tangent upon the rim. Each of the braces incorporates a slot therein, and into which the flange or blade extends therethrough, in the assembled device. A series of compression springs mount onto the braces, and are biased against the sides of each of the blades that extend therethrough. Hence, when the tire hits a bump, these blades bias against the various springs, to function as shock absorbers, and to furnish a suspension means for the wheel.

The suspension means includes and provides for angulated support, for each of the blades that extend through the slots, so that the vertical forces and the angular forces can also be absorbed by the angulated relationship of the various braces within the tire rim, to provide more than just vertical suspension and shock absorbing during usage. This device, it is believed, provides a much greater suspension for the wheel, and can absorb far more shock, particularly where these types of vehicles are used in an off-road setting, as upon rough terrain.

The suspension system for this invention could include other polygonally shaped braces, such as a square, a five sided polygon, or more, all arranged symmetrically within the rim of the tire in which the suspension system is incorporated. In a specific embodiment, the wheel structure at its central axis will incorporate a three, radially disposed, bladed device. The bladed device is affixed to the tire axis as aforesaid. The blades extend radially outwardly, within the tire, and align with its rim, for cooperating with triangulated braces that are affixed to the internal edge of the rim of the tire. These three braces each incorporate their individual slots therein, and into which one of the blades extends from the bladed device, and are cushionally held in position within the triangulated brace by means of a series of perpendicularly arranged and opposing compression springs, two of which mount onto each brace, and bias against the sides of each blade, to act as a cushioning means thereat. As previously summarized, it is just as likely that this type of suspension system could include other numbers of integral blades, of other polygonal shapes, such as a square or pentagon, for cooperating with a bladed structure having the same number of blades, that fit within a like number of braces, depending on the type of polygonal suspension system designed and employed for use with this invention.

It is, therefore, the principal object of this invention to provide an internal wheel suspension and shock absorbing system.

Another object of this invention is to provide a polygonal form of spring biased support, for a rotatable bladed mechanism, that integrally connects with the axle for a vehicle, such as a bicycle, for providing angular support and suspension for its rim and tire during movement.

Yet another object of this invention is to provide for a suspended type of blade mechanism, embraced within slots of a polygonal brace, for furnishing angular support to a vehicle tire, and greater shock absorbing during its impact when used on rough terrain.

Yet another object of this invention is to provide a shock absorbing and internal wheel suspension system that can be quickly removed and repaired from a bicycle or other vehicle wheel, during usage.

Yet another object of this invention is to provide for shock absorbing that is effective for absorbing impact that can be generated and oriented from various angular positions depending on the type of rough terrain that is encountered by a vehicle wheel.

These and other objects may become more apparent to those skilled in the art upon review of the invention as described herein, and upon undertaking a study of the description of its preferred embodiment, in view of the drawings.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
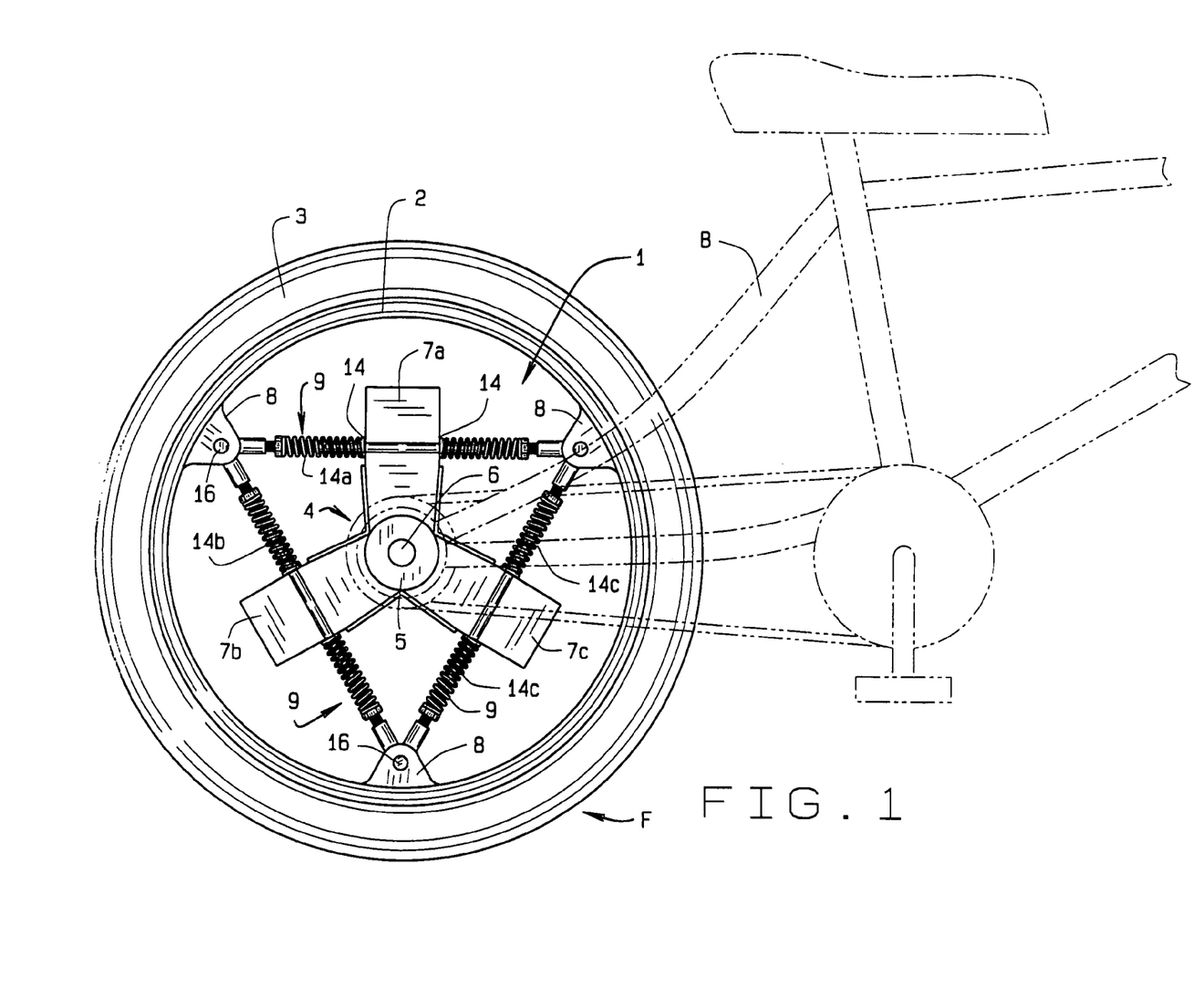
FIG. 1 provides a back segment view of a bicycle, such as a mountain or all-terrain bike, showing the internal wheel suspension and shock absorbing system incorporated into the rear wheel of this invention.

In referring to the drawings, and in particular FIG. 1, the internal wheel suspension and shock absorbing system of this invention is disclosed. The system, as noted at 1, mounts within the rim 2 of the tire 3, and therein provides for full suspension, and shock absorbing, for the bicycle B as noted. But, this particular suspension system could also be incorporated within any other type of cycle, whether it be a motorcycle, a dirt bike, or even incorporated into any other wheeled system, even for a vehicle, or select automobiles.

As can be seen, the invention incorporates a bladed device 4, which comprises a hub 5 that mounts onto the axle 6 of the shown vehicle. The bladed device includes a series of blades 7 in this particular device, there being three in number, as shown 7a, 7b, 7c, which radiate out from the central hub at approximately 120 degrees apart, for this particular embodiment. The angle of the blades is determined from the formula 360/n, where n is the number of blades.

The internal rim 2 has a series of inwardly directed mounts 8, and each of these mounts is provided for securement of a brace 9, as shown. These braces are sector applied, and connect between the mounts 8, for fixedly locating therewith.

Figure 3:
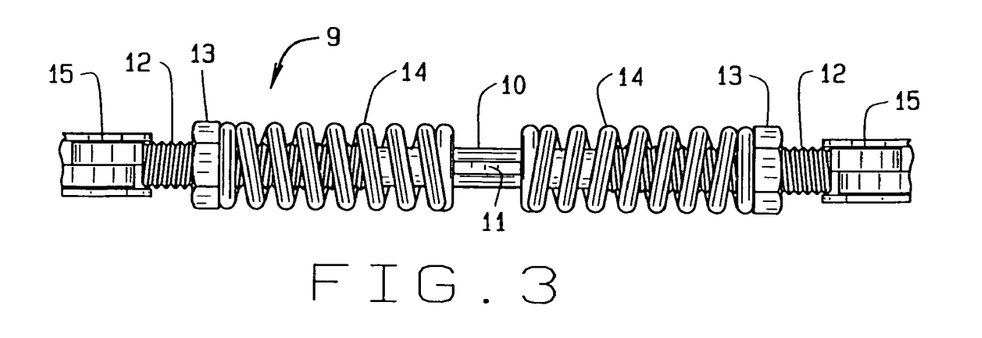
FIG. 3 provides a partial view of one of the braces of this invention taken along the line 3-3 of FIG. 2.

As can later be seen in FIG. 3, each of the braces 9 include a central shaft 10, which has a length of slot 11 provided centrally and longitudinally therein, and through which the blades 7 insert, with some degree of clearance, so that the blade can shift slightly laterally within each brace, during application and usage of the suspension system. The shaft, at its outward segments, is threaded, as can be seen at 12, and threadily engaged on the shaft are the fasteners, or nuts 13, for adjustability thereon. A pair of biasing members or springs 14 is provided upon the shaft, biasing against the adjustment nuts 13, and when a blade 7 is located within the slot 11, of the shaft, the springs 14 bias against the sides of each blade 7, from opposite directions. Thus, the pressures applied by the adjustment nuts 13, against the springs 14, are exerted against the sides of each blade 7, and thus provides for a resistance against any impact that is encountered by the vehicle, through its axle 6, and hub 5 and through the variety of blades 7, when mounted into the installation as in FIG. 1. The springs can be replaced by hydraulic or pneumatic cylinders as shown at 14a, in FIG. 1. The outer ends of each shaft 10 extend further outwardly, as at 15, and incorporate an aperture or other fastening means therein, to provide for their securement, as by means of the pivot pin or fasteners 16, onto each mount 8, as can be seen.

Thus, for example, when the tire 3, as shown in FIG. 1, encounters an impacting force, such as when it hits a rock or other obstruction, particularly when ridden off-road, the type of force may be in the direction of the arrow, as noted at F, also in FIG. 1. When that occurs, the blades 7 are free to shift slightly within their respective bracing slots 11, to absorb some of the force, but the bulk of the forces encountered, which will orient vectorially within the structure of the arranged blades, and their respective braces, will bias against the various springs, in the following manner. For example, when a force F is applied in the direction noted, the blade 7a will exert a force against the spring 14a, as can be understood. In addition, the angular direction of the vectorial force, exerted upon the blade 7, will be applied against the spring segment 14b and absorbed therein. Little of the force will be exerted upon the spring 14c, since, the force F as applied is aligned with the blade 7c, when the force is directed and applied in this manner. Nevertheless, multiple suspension is provided through the various blades and their interrelationship with the braces, and the variety of springs 14 provides for absorption of the impact forces encountered, during performance upon the cycle B.

When greater force is desired to be applied by the springs 14 against the sides of the blades, the adjustment nuts 13 can simply be tightened, to resist the impacting forces, but when tightened too excessively, may transmit more of the impacting force directly to the rider, through the bike B, during usage. And, if the adjustment nuts are loosened too extensively, the blades may have too much freedom to shift within their slots 11, which may provide too much shifting of the wheel 3, relative to its mount upon the axle 6, and which will be felt by the rider. Such looseness is also undesirable. Hence, the proper adjustment of the adjustment nuts 13, that bias a reasonable force against the sides of the blades 7, should be sufficient to provide for both suspension, and for cushioning of the forces that generate upon impact, that can be absorbed by the shock absorbing system of this arrangement.

Figure 2:
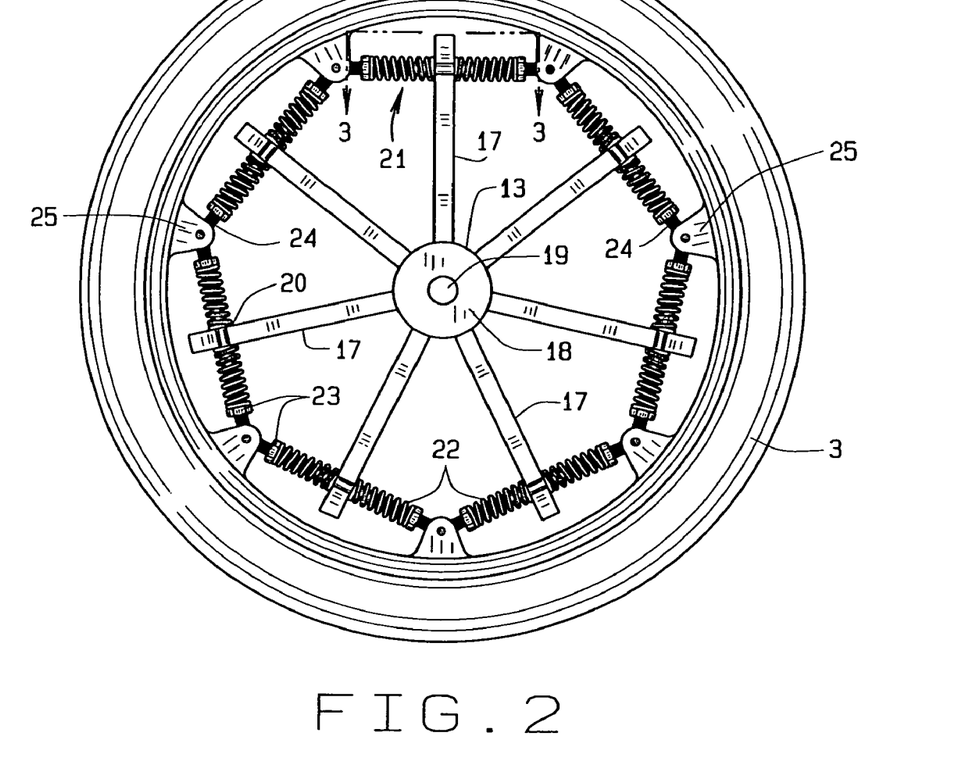
FIG. 2 shows a variation upon the suspension system, indicating how a polygonal number of shock absorbing and suspension blades, here seven, are incorporated into the suspension system of this inventive wheel.

FIG. 2 shows a modification to the internal wheel suspension and shock absorbing system of this invention. In this embodiment, the blade system will incorporate more blades 17 in its assembly. These blades 17 are also integrally mounted upon the hub 18, as noted. And, the hub fits upon the axle 19 for the vehicle. The blades 17 extend outwardly, in a radial fashion, approximately 51.4 degrees apart, again from the formula 360/n where n is the number of blades. The blades extend through slots provided within the shafts 20 or each of the braces 21. Springs 22 bias against the sides of each of the blades 17, and the biasing of each spring can be adjusted by means of the adjustment nuts 23, in the manner as previously explained with regard to the system shown in FIG. 1. In the same manner, when any force is directed against the tire 3, the forces become vectorialized, and absorbed through the blades 17, and the respective associated impact springs 22, in the same manner as previously described. The blades are free to shift slightly within their respective shaft slots, but, such shifting is resisted by means of the associated springs of the other blades within the system, in a manner as can be understood upon review of the structure of this system as shown in FIG. 2.

Each of the braces 21 are secured by their outer segments 24 to their respective mounts 25 similar to that of the embodiment as previously described. It should be noted that in the preferred embodiment the blades used, function more effectively if an odd number of blades and braces are used.

Figure 4:
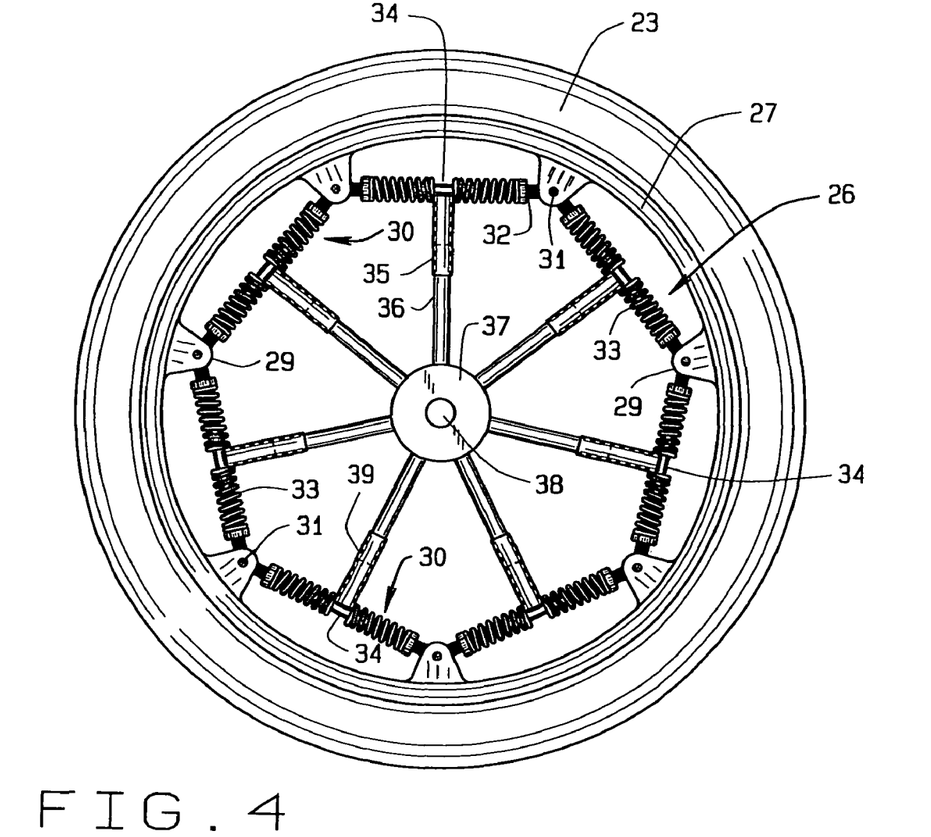
FIG. 4 shows a variation upon the suspension system of this invention wherein the blades are telescopically formed and supported upon the braces by a shiftable sleeve.

A further modification to the structure of the internal wheel suspension and shock absorbing system of this invention is disclosed in FIG. 4. The shock absorbing means 26 is shown mounted within the rim 27 which supports its tire 28 when assembled. The rim incorporates the related type of mounts 29 similar to those as previously described. And, braces 30 are provided spanning the space between adjacent mounts 29, and are fixed thereto by means of the fasteners 31. Each of the braces 30 are constructed similar to those as previously described, having threaded ends that mount the adjustment nuts 32, for tightening against the biasing springs 33, in order to adjust the amount of compression that each spring will absorb, when functioning as the shock absorbing system of this invention, in the manner as previously described. But, the braces 30, in this instance, at their central location, do not include the slots 11, as previously described, but rather, centrally mounted, for slight shifting movement upon each brace, is a sleeve 34. Connected in cooperation with each of the sleeves 34, is a length of tube 35 which telescopically mounts therein a rod means 36, for relative movement between these two components. Then, the rod means 36 secures or is integrally formed onto the hub 37 which pivotally mounts onto the axle 38, or secures thereon for rotation of the entire wheel, during its usage.

When an impacting force is encountered, any slight shift radially of the tire 28 relative to the axle 38, will cause the various telescopic rod and tube means 35 and 36 to slightly contract, or to lengthen, depending upon the amount and direction of force exerted. And, any lateral shifting for absorbing the vectorial forces generated when an impacting force is encountered by the tire, the sleeves 34 may likewise shift laterally upon their braces 30, and bias against their respective springs 33, to absorb the vectorial forces encountered, and to push and absorb against the same.

The telescopic rod and tube means, 35 and 36, may either be formed as hydraulic cylinders, pneumatic cylinders, or have compression springs located therein, so as to provide resistance against any forces exerted along the radial disposition of these telescopic means, within their structural setting when applied to this wheel suspension system.

Figure 5:
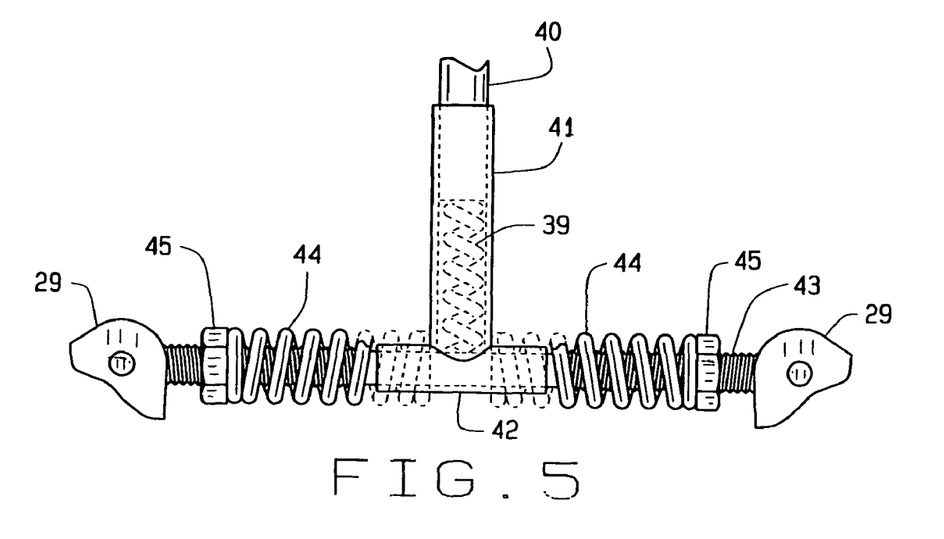
FIG. 5 shows a modification to a telescoping type of tube and rod mounted onto a brace for lateral shifting.

FIG. 5 discloses a modification to the telescoping type of mount for use in conjunction with this invention. As can be noted, the telescoping mount includes the rod 40 spring biased, as at 39, within the tube 41 and the tube 41 has fixed thereto a T member 42 that rides upon the brace 43. Thus, both longitudinal shifting can be achieved for the system through the telescoping rod and tube, and the lateral shifting of the T member 42, against the bias of the springs 44 and provide for absorption of the vectorial forces generated within the shock absorbing system, during usage. Threaded nuts 45 can be adjusted to lighten or enhance the compressive force generated by the spring 44, against the telescoping mount. The ends of the brace 43 are secured onto the mounts 29, as previously explained. This shows a variation upon the shock absorbing and suspension system, but yet can operate just as effectively as those as previously defined.

Figure 6:
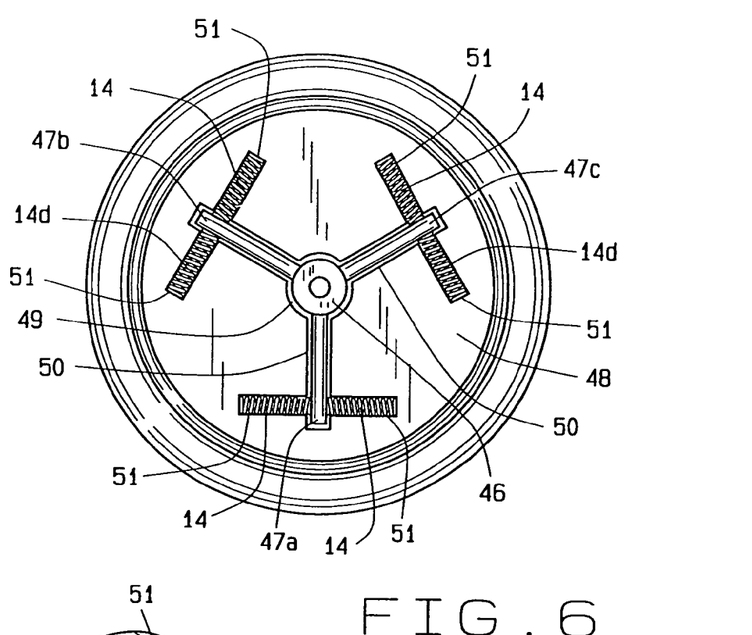
FIG. 6 shows an alternate embodiment of the present invention encased within a disc.

Another embodiment of the invention appears in FIG. 6. As before, this embodiment has a bladed device with a central hub 46 and equally spaced radial blades 47a, 47b, 47c, here shown as three in number. The bladed device fits into a disc 48 that connects to the rim 2. The disc can connect by mechanical means, as in bolts or rivets, or weld directly to the rim. The disc has a generally centered well 49, shaped to admit the hub, and equally spaced radial passages 50 extending from the well. Further, the passages 50 and the well 49 have sufficient tolerances to permit movement of the bladed device. Away from the well and towards the rim, each passage 50 has two perpendicular half sleeves 51. The half sleeves are generally parallel to a tangent upon the rim at a radius extending through a blade. The half sleeves for all of the blades are coplanar within the disc. The half sleeves have a generally half round cross section with the diameter located in the plane of the disc, a closed end located away from the blade and an open end towards the blade. A spring 14 is placed within each sleeve 51, abutting the closed end, passing through the open end and contacting the blade. The springs have sufficient strength to resist the angular portion of the maximum rated load for the wheel during usage.

When the wheel is stationary, axle loads are transferred to the blades not perpendicular to the surface below the wheel. Here in FIG. 6, the two upper blades, 47b and 47c transmit a portion of the axle load to the springs, particularly 14d. The portion of the axle load is dependent upon the angle of the blade to the surface below the wheel. Transferring axle load to the springs prevents the blade 47a from lowering and puncturing the disc or the rim.

In usage, the tire transmits forces to the rim which then transmits the forces to the disc of the alternate embodiment. The disc transmits components of forces to the closed ends of the sleeves and then proportionally into the springs of the alternate embodiment. The springs then apply proportions of the forces to the blades which transmit the forces to the hub and the axle of the vehicle. When acceleration or braking forces are applied to the axle, those forces are proportioned among the blades which transmit the proportionate force to the springs contained within the half sleeves. In this way, the springs, in cooperation with the disc, serve as the suspension system for the wheel.

Figure 7:
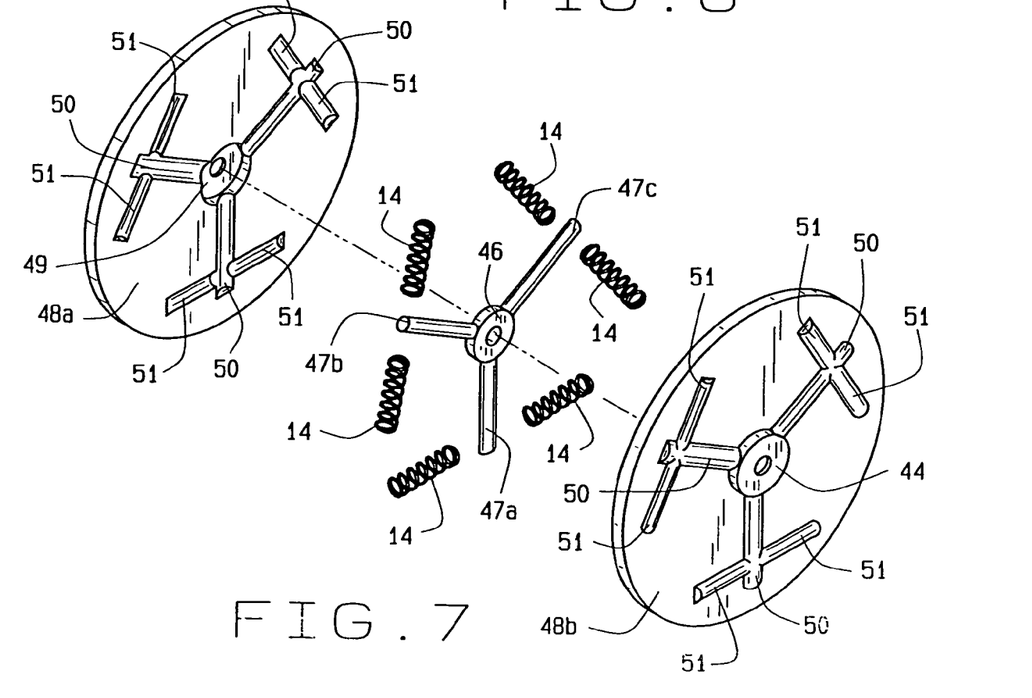
FIG. 7 shows an exploded view of the alternate embodiment using the disc.

Then FIG. 7 shows the alternate embodiment with the components in an exploded view. The disc has two halves 48a, 48b, that are mirror images of each other. Each half of the disc has a well 49 from which extend radial passages 50, here shown three in number. Each passage has two perpendicular half sleeves 51 that extend parallel to a tangent to the disc. Contained within the disc, here shown with the halves separated, the alternate embodiment has a bladed device with a central hub 46 and equally spaced radial blades 47a, 47b, 47c, here shown as three though other numbers of blades are possible. Each blade extends away from the hub radially in an equiangular arrangement. Opposite the hub, each blade has two springs 14 abutting the sides of the blade. The bladed device and springs are contained within the well, passages, and the sleeves when the two halves 48a, 48b are aligned and closed upon one another. In this alternate embodiment, the disc 48 is made of steel in sheet form with the wells, passages, and half sleeves stamped therein. Alternatively, the disc is made of a composite.

Figure 8:
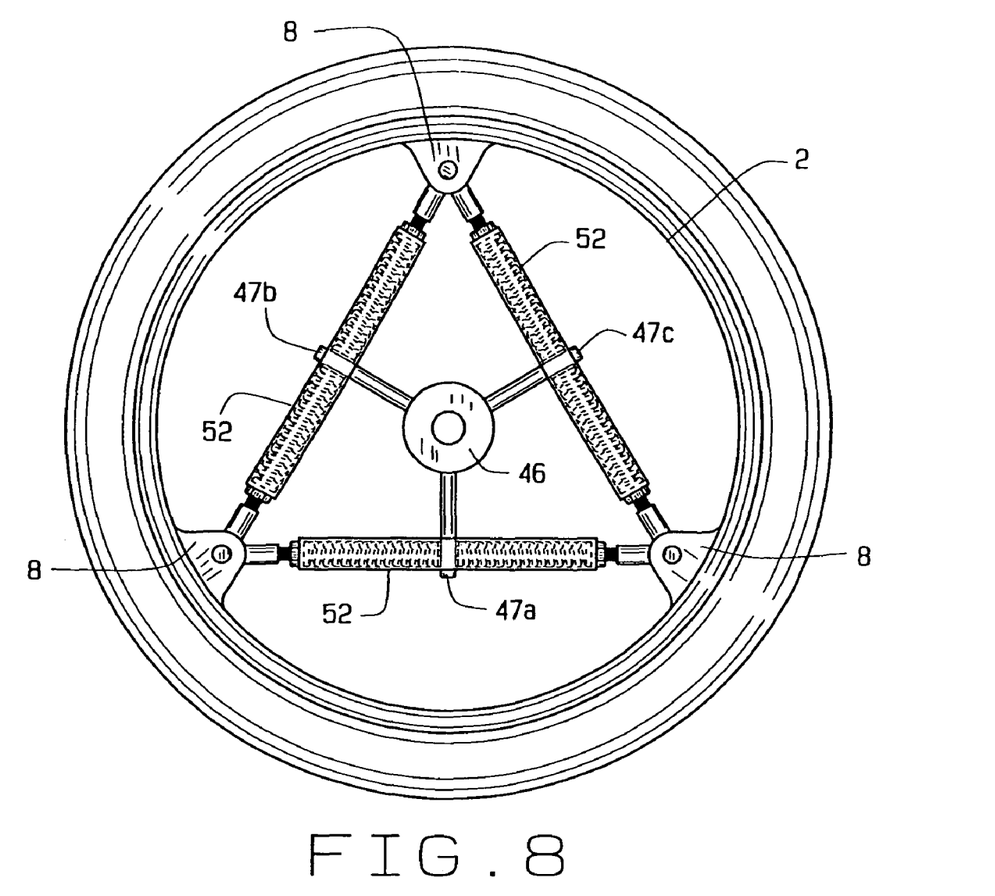
FIG. 8 shows a further alternate embodiment where the blades pass through a tubular member holding springs within; and, FIG. 9 shows a top view of the tubular member with a slot through which a blade passes and abutting spring.

A still further embodiment appears in FIG. 8, though similar to FIG. 1. This embodiment has a rim 2 with a plurality of mounts 8 equally spaced along the inside of the rim, here shown as three. As before, a bladed device has a central hub 46 that mounts to an axle as before. From the hub, blades 47a, 47b, 47c, extend equally spaced and radially towards the rim. Then each blade continues through a brace here shown as a tube 52. Each tube then connects to two adjacent mounts. Each tube has a central, longitudinal slot 53 through which a blade passes. The blade passes completely through the tube. Each tube is generally hollow with two opposed closed ends that connect to the mounts. Within the tube, two spaced apart springs 14 abut the sides of each blade.

When the wheel is stationary, axle loads are transferred to the blades not perpendicular to the surface below the wheel. Here in FIG. 8, the two upper blades, 47b and 47c transmit a portion of the axle load to the springs contained with the corresponding tubes 52, generally the lower springs. The portion of the axle load is dependent upon the angle of the blade to the surface below the wheel. Transferring axle load to the springs prevents the blade 47a from lowering and puncturing the disc or the rim.

Figure 9:
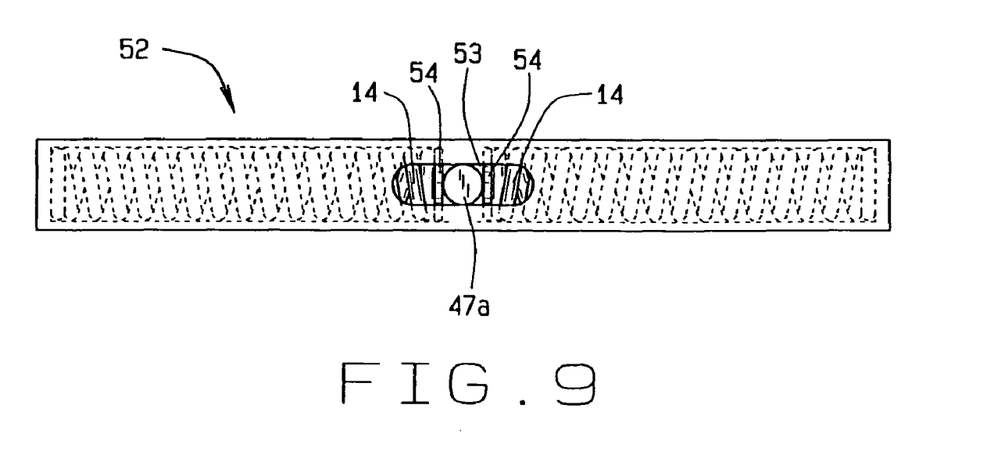

A tube 52 is further shown in FIG. 9. The tube has a generally elongated shape of sufficient length to span a chord across the rim between two adjacent mounts. The tube 52 has a generally round hollow cross-section and two closed opposed ends. Within the tube are located two springs 14 that extend axially along the longitudinal axis of the tube. The springs have sufficient strength to resist a proportion of the maximum wheel load. Generally centered upon the tube, a slot 53 admits a blade that passes between the two springs in a tube. The slot has a shape corresponding to the cross section of the blade, here shown as rectangular. The longitudinal axis of the blade aligns with the longitudinal axis of the slot. The slot has sufficient length to allow travel of the blade when the hub 46 rotates during usage and acceleration and braking forces are applied. Each spring 14 has a washer 54 upon the interior of the spring that abuts the blade. Each washer provides for firm application of the spring force to the blade as the blade transmits forces to the springs during usage.

It should be readily noted that the concept of this invention is to provide a series of radially spaced members that function like spokes radiating from the wheel hub, and which bias against perpendicularly arranged springs, which are adjustable, for the purpose of absorbing the various forces generated when an impact is encountered by the tire during usage upon any type of vehicle. The forces, whether they be radially disposed, perpendicularly disposed, or provide any other vectors of force, can be absorbed by the various cushioning springs that are built into the structure of this suspension system, and likewise, can cooperate with the various blades, or telescopic tubes, that radiate from the hub, for cushioning against any impact force encountered, and to absorb it from transferring to the rider or driver, during usage of such a vehicle in which the suspension system of this invention is installed.

Essentially, the invention includes the design of a wheel system, where the rim and tire will move independently of its hub, when a force is encountered. While the various designs and modifications herein are similar, they generally provide for the same desired results, to function as a suspension and shock absorbing system that can absorb vectorial forces.

As defined, each of these systems incorporates a one piece hub, which will have a number of blades radiating therefrom, and it can be any number of such blades, as defined, provided it is at least 3 in number. Preferably, an odd number of blades will be used to encounter and to absorb the vector of the forces generated within the wheel, during usage. In the preferred embodiment, three such blades may be used. In another embodiment, 5 or 7 such blades may be applied. In a further modification, the telescopic rods may be used in the system as shown in FIG. 4. And, each telescoping rod may also include a spring-like or cushioning means therein, as at 39, to provide for radial cushioning of the wheel, during usage.

In addition, the telescoping rods or blades cooperate with the sector arranged braces, which are affixed to the interior of the rim, in the cooperative manner as described in this application. Adjusting nuts 45 are threadily applied onto each of the shaft portions 43 for each brace, to increase the lateral type of forces generated during impact, to cushion and absorb such forces from being transferred from the wheel, through the vehicle, and to the rider.

It is unique that the entire wheel structure for this invention has few moving parts, thus making it rather reliable and safe, in usage. The wheel resists any and all lateral forces applied to it because the movement is very near the rim, as opposed to the hub, where the forces are at their greatest. Dynamic forces on the wheel will allow the rim and tire to move independently on the hub, and the shock will be absorbed by the compression springs, and the slight radial shifting of the hub and its blades or telescoping rods, relative to the rim braces. Centrifugal forces generated during movement of the wheel will cause the rim to center in relation to the hub, with a very quick reaction time to achieve such.

Upon acceleration and braking, the slots in each of the brace shafts will allow the blades to ride therein, which causes the rotational forces from the hub to stop and lock any movement of the rim and tire, relative to the hub. The same is true of any braking forces generated within the wheel during usage of the vehicle. Travel of the rim to the hub exceeds 1½ inches, on a 12-inch rim.

The wheel of this invention will not collapse under lateral acceleration, braking, vertical, or horizontal forces when they are encountered either strategically or dynamically. Under all of these forces, when experienced, the present invention allows for movement of the rim to absorb all of the road shock, relative to its hub, to minimize the amount of transfer to the wheel axle, and into the vehicle structure.

The modification for this wheel, as previously explained, incorporating the telescoping tube design, utilizes various rods and tubes, as opposed to blades, which are formed as sleeves, which ride on the brace shaft, during usage. The design is basically the same as the principal embodiment, but allows for more rim travel, because the length of the telescoping rods can be made longer than the shafts such that the sleeves ride on the shaft and can be made even a little longer, allowing for more travel of the rim relative to its hub. The shafts can be mounted closer to the rim, providing greater lateral strength and less run-out of the rim is encountered. Essentially, the designs for this type of cushioning structure can be easily manufactured, and in the preferred embodiments, will be made in those designs that incorporate the odd number of blades, telescoping rods, and braces, generally in the 3, 5, 7, or 9 design, although even number assemblies will also work similarly. Although this design is built for cycles or motorcycles, it could also be suitable for vehicles, or dune buggies or SUVs, because it can successfully resist all forces without collapsing.

Variations or modifications to the subject matter of this invention may occur to those skilled in the art upon review of the summary of the invention as provided herein. The description of the invention as set forth in the description of the preferred embodiment, and as shown in the drawings, are provided for illustrative purposes only. The embodiments, as described, are furnished for explaining the spirit of this invention.

I claim:

1. An internal suspension system for a wheel having a thickness and a tire there upon, comprising;
    a hub, having a generally cylindrical shape;
    a rim having a generally round hollow shape of greater diameter than said hub, an interior surface opposite said tire and having at least five equally space mounts;
    at least five blades equally spaced around said hub and extending radially from said hub and having less length than the radius of said rim; and
    at least five braces, each of said braces connecting to two adjacent mounts, and each brace accepts therethrough one of said blades radially outwardly from said hub and including at least one biasing member upon each brace.

2. An internal suspension system for a wheel having a thickness and a tire there upon comprising;
    a hub, having a generally cylindrical shape;
    a rim, having a generally round hollow shape of greater diameter than said hub, an interior surface opposite said tire and having at least five equally spaced mounts;
    at least five blades equally spaced around said hub and extending radially from said hub and having less length than the radius of said rim;
    at least five braces, each of said braces connecting to two adjacent mounts and each brace accepting one of said blades radially outwardly from said hub, and including at least one biasing member; and
    each of said braces having a shaft with a center longitudinal slot to admit one of said blades therethrough, and two opposite outer segments, two biasing members coaxial with said shaft and located axially outwardly from said brace slot said outer segments being threaded, at least one adjustment nut upon each of said segments and contacting said biasing member, and a connector upon each of said segments that pivotally connects to one of said mounts.

3. The internal suspension systems for a wheel of claim 2 wherein said basing members are springs.

4. The internal suspension system for a wheel of claim 2 and further comprising;
    said slot in each of said braces having a rectangular shape; and
    each of said blades having a rectangular shape to cooperatively locate it with clearance within said shaft slot.

5. An internal suspension system for a wheel having a thickness and a tire thereupon, comprising;
    a hub, having a generally cylindrically shape; a rim having a generally round hollow shape of greater diameter than said hub, and interior surface opposite said tire and having at least seven equally spaced mounts;
    at least seven blades equally spaced around said hub and extending radially from said hub and having less length than the radius of said rim, and
    at least seven braces each of said braces connecting to two adjacent mounts, and each blade extends through one of said braces radially outwardly from said hub, and including at least one biasing member upon each brace.

* * * * *